(12) United States Patent
Lee et al.

(10) Patent No.: US 6,743,350 B2
(45) Date of Patent: Jun. 1, 2004

(54) APPARATUS AND METHOD FOR REJUVENATING COOLING PASSAGES WITHIN A TURBINE AIRFOIL

(75) Inventors: Ching-Pang Lee, Cincinnati, OH (US); Robert Alan Johnson, Simpsonville, SC (US); Bin Wei, Mechanicville, NY (US); Hsin-Pang Wang, Rexford, NY (US); Lawrence Bernard Kool, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 128 days.

(21) Appl. No.: 10/063,087

(22) Filed: Mar. 18, 2002

(65) Prior Publication Data

US 2003/0173213 A1 Sep. 18, 2003

(51) Int. Cl.[7] .............................. B23H 11/00; B23H 3/00
(52) U.S. Cl. ..................... 205/686; 205/640; 205/660; 205/671
(58) Field of Search .................. 205/640, 660, 205/671, 686

(56) References Cited

U.S. PATENT DOCUMENTS

| | | |
|---|---|---|
| 4,514,144 A | 4/1985 | Lee |
| 5,738,493 A | 4/1998 | Lee et al. |
| 5,797,726 A | 8/1998 | Lee |
| 6,110,350 A | 8/2000 | Wei et al. |
| 6,200,439 B1 | 3/2001 | Wei et al. |
| 6,234,752 B1 | 5/2001 | Wei et al. |
| 6,264,822 B1 | 7/2001 | Wei et al. |
| 6,267,868 B1 | 7/2001 | Wei et al. |
| 6,290,461 B1 | 9/2001 | Wei et al. |
| 6,303,193 B1 | 10/2001 | Guida et al. |
| 6,554,571 B1 * | 4/2003 | Lee et al. ............... 416/92 |

OTHER PUBLICATIONS

Application No. 09/683,189 (RD–27,957). Ching–Pang Lee et al., filed Nov. 29, 2001, now U.S. pat. No. 6,554,571 published Apr. 29, 2003.

* cited by examiner

Primary Examiner—Wesley A. Nicolas
(74) Attorney, Agent, or Firm—Penny A. Clarke; Patrick K. Patnode

(57) ABSTRACT

An electrode for rejuvenating a cooling passage within an airfoil, the electrode including a tip, an end, a conductive core extending between the tip and the end, and an insulating coating disposed on the conductive core. The insulating coating exposes a number of conductive strips of the conductive core extending between the tip and the end. The insulating coating forms a number of insulating portions and further exposes a number of spacer portions of the conductive core longitudinally positioned between the insulating portions. The insulating portions substantially span a distance between the tip and the end and are positioned between the conductive strips.

11 Claims, 8 Drawing Sheets

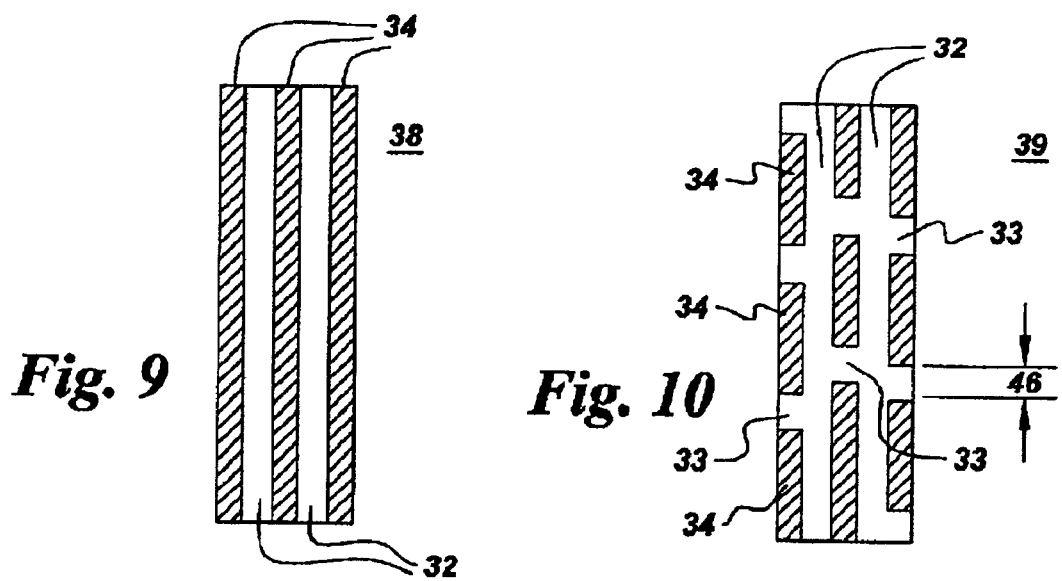
*Fig. 9*
*Fig. 10*
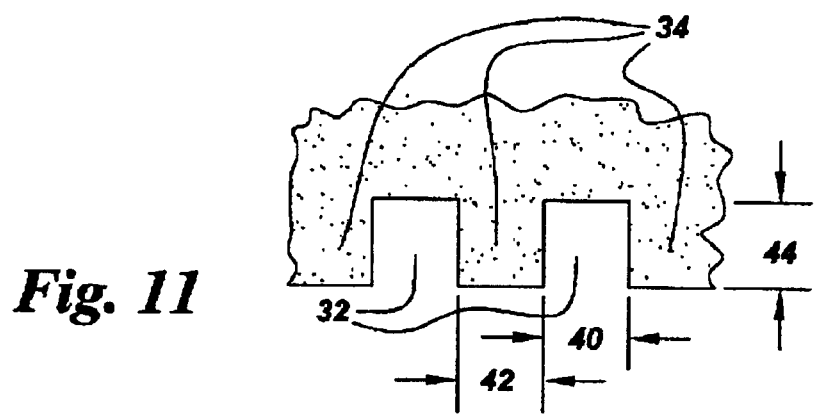
*Fig. 11*
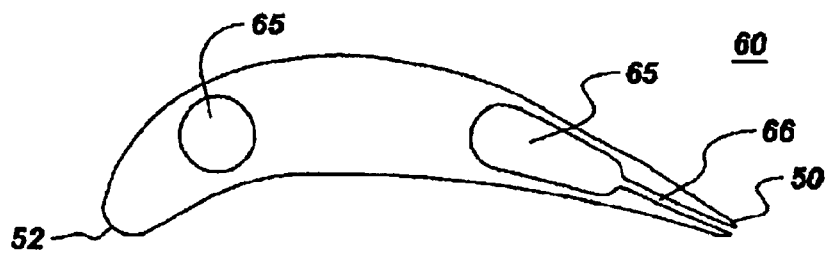
*Fig. 12*
Prior Art ized U.S. Pat. No. 6,264,822 B1, Bin Wei et al, entitled "Method for
APPARATUS AND METHOD FOR REJUVENATING COOLING PASSAGES WITHIN A TURBINE AIRFOIL

CROSS REFERENCE TO RELATED APPLICATIONS

This application is related to commonly assigned U.S. Pat. No. 6,264,822 B1, Bin Wei et al, entitled "Method for Electrochemical Machining," and U.S. Pat. No. 6,267,868 B1, Bin Wei et al, entitled "Method and Tool for Electrochemical Machining," which are incorporated by reference in their entirety. This application is also related to commonly assigned U.S. Pat. No. 6,200,431 B1, Bin Wei et al, entitled "Tool for Electrochemical Machining," U.S. Pat. No. 6,234,752 B1, Bin Wei and Hsin-Pang Wang, entitled "Method and Tool for Electrochemical Machining," and U.S. Pat. No. 6,303,193 B1, Renato Guida et al, entitled "Process for Fabricating a Tool Used in Electrochemical Machining," which are incorporated by reference in their entirety. This application is also related to commonly assigned, copending U.S. patent application Ser. No. 09/683,189, Ching-Pang Lee et al, entitled "Curved Turbulator Configuration for Airfoils and Method and Electrode for Machining the Configuration," which is incorporated by reference in its entirety.

BACKGROUND OF INVENTION

The invention relates generally to cooling passages within airfoils and, more particularly, to rejuvenating cooling passages within airfoils of gas turbine blades and gas turbine vanes (or turbine airfoils) to enhance convective cooling thereof. As used herein, the term "blade" encompasses both blades and buckets, which two terms are typically used for aircraft engine and land-based applications, respectively. The term "vane," as used herein, means the airfoil portion of a nozzle and encompasses both aircraft engine and land-based applications.

In gas turbine engines, hot gases from a combustor are used to drive a turbine subjecting many components, such as stationary vanes in high pressure turbine nozzles and turbine blades, to high temperatures and stress. The capacity of the engine is limited to a large extent by the ability of the turbine vanes and turbine blades to withstand the resulting temperature and stress.

Typical turbine vanes and blades include an airfoil, over which the combustion gases flow. A vane airfoil is positioned between an outer and an inner band to form the turbine nozzle. In order to decrease vane and blade temperature, thereby improving thermal capability, it is known to supply cooling air to hollow cavities within the turbine airfoils. Typically one or more cooling passages are formed within a turbine airfoil with a coolant (such as compressor discharge air) supplied through an opening in the airfoil and allowed to exit through cooling holes strategically located on an outer surface of the airfoil. The cooling passages provide convective cooling inside the airfoil and film-type cooling on the surface thereof. Many different cavity geometries have been employed to improve heat transfer to the cooling air inside the airfoil. For example, cooling passages typically have circular, racetrack, rectangular, square or oblong transverse cross-sectional shapes.

One known turbine blade airfoil cooling circuit includes a number of unconnected longitudinally-oriented passages (hereinafter "radial cooling passages") extending for example through an airfoil of a turbine rotor blade. Each radial cooling passage receives cooling air from near a root of the airfoil and channels the air longitudinally toward a tip of the airfoil. Other cooling circuits are serpentine, comprising a number of longitudinally-oriented passages which are series-connected to produce serpentine flow. For either cooling circuit, some air exits the airfoil through film cooling holes near the airfoil's leading edge and some air exits the airfoil through trailing edge cooling holes.

Turbine vanes narrow in thickness to a relatively narrow trailing edge. Consequently, cooling the trailing edge is difficult. To cool the turbine vane, vane airfoils generally include one or more central passages and a row of discharge holes formed in the trailing edge of the turbine vane airfoil. Discharge holes may also be provided in a leading edge of the vane airfoil. Coolant flows into the central passage(s) from the tip and/or root of the vane airfoil and out of the discharge holes. Further, one or more rows of film cooling holes may be provided along a pressure sidewall of the vane airfoil. In addition, a vane airfoil suction sidewall may include several rows of film cooling holes between a leading edge of the vane airfoil and a maximum thickness region thereof.

Modern turbine airfoils often include turbulence promoters ("turbulators") and other cooling improvements to enhance heat transfer. However, in the 1960's and 1970's, turbine cooling technology in turbine airfoils used in power generation turbines typically involved using shaped tube electrochemical machining (STEM) to drill circular or oval cooling passages in the turbine airfoils. The surfaces of these older STEM drilled cooling passages are typically smooth, without any turbulators.

Numerous turbine airfoils incorporating the older STEM drilled cooling passages remain in service today. These turbine airfoils are often repaired during regularly scheduled maintenance overhauls of power generation turbines. Such maintenance overhauls occur after a period of field service, for example every ten thousand (10,000) service hours. Upon overhaul, generally a number of the turbine airfoils exhibit significant deterioration so as to require repair to support continuing service for the turbine airfoils. Currently turbine airfoil repairs include surface cleaning, coating stripping, crack inspection, crack repair, tip repair, and recoating. These repair processes are performed to restore the airfoil to its original condition to prevent its service life from being cut short due to wear. However, current repair processes do not improve the cooling passages within the turbine airfoils and hence do not enhance the heat transfer of the cooling passages to the coolant. Consequently, the repaired turbine airfoils do not have extended services lives under the original operating conditions, nor do they allow elevated operating temperatures or reduced cooling flow to improve the efficiency of the overhauled turbine engines.

SUMMARY OF INVENTION

Accordingly, there is a need in the art for a method to rejuvenate cooling passages within turbine airfoils as part of the repair process during the engine maintenance overhaul. Advantageously, rejuvenation of the cooling passages would enhance the heat transfer coefficient of the turbine airfoils. Improved heat transfer provides two related benefits: life enhancement for the turbine airfoil and increased turbine engine efficiency. More specifically, improved heat transfer provides either a cooler turbine airfoil (for the same coolant flow), yielding a longer service life for the airfoil, or alternatively facilitates reduced cooling flow (i.e., bleeding off less compressor air), increasing turbine engine efficiency.

There is a corresponding need for turbine airfoils having the rejuvenated radial cooling-passages and for a tool to efficiently rejuvenate the cooling passages.

Briefly, in accordance with an embodiment of the present invention, an electrode for rejuvenating a cooling passage within an airfoil is disclosed. The electrode includes a tip, an end, a conductive core extending between the tip and the end, and an insulating coating disposed on the conductive core. The insulating coating exposes a number of conductive strips of the conductive core extending between the tip and the end. The insulating coating forms a number of insulating portions and further exposes a number of spacer portions of the conductive core longitudinally positioned between the insulating portions. The insulating portions substantially span a distance between the tip and the end and are positioned between the conductive strips.

In accordance with another embodiment, an electrochemical machining method for rejuvenating at least one cooling passage within an airfoil is disclosed. An inner surface of the cooling passage is prepared for electrochemical machining, including removing residue from the inner surface. An electrode is positioned in the cooling passage. The electrode includes a conductive core and an insulating coating, and the insulating coating exposes a number of exposed portions of the conductive core. A groove pattern is machined on the inner surface of the cooling passage using the exposed portions of the conductive core by passing an electric current between the electrode and the airfoil while circulating an electrolyte solution through the cooling passage. The machining produces a rejuvenated cooling passage.

In accordance with an airfoil embodiment, an airfoil includes a tip, a root, a body extending between the tip and the root, and at least one cooling passage formed in the body. The cooling passage has an inner surface and a groove pattern formed on the inner surface and is configured to receive coolant. The groove pattern includes a number of grooves, extending along the length of the cooling passage, a number of fins positioned alternately with the grooves and substantially spanning the length of cooling passage, and a number of connectors. Each connector is longitudinally positioned between two of the fins and connects two of the grooves.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 9 is a partial cross-sectional view of the rejuvenated cooling passage shown in FIG. 8 according to a continuous fin embodiment and shows a groove pattern formed on an inner surface of the rejuvenated cooling passage;

FIG. 10 is a partial cross-sectional view of the rejuvenated cooling passage shown in FIG. 8 according to an interrupted fin embodiment and shows the groove pattern for this embodiment;

FIG. 11 is an enlarged view of the fins and grooves depicted in FIGS. 8–10;

FIG. 12 is a cross-sectional view of a vane airfoil having two central passages for cooling the vane airfoil;

DETAILED DESCRIPTION

An electrode 110 embodiment and an electrochemical machining method embodiment for rejuvenating at least one cooling passage 30, or 64, 65, 66 within an airfoil 10 or 60 will be described with respect to the airfoils illustrated in FIGS. 1–4. By way of background, a turbine blade airfoil 10 (or "blade airfoil") is shown in FIGS. 1 and 2, and a turbine vane airfoil 60 (or "vane airfoil") is illustrated in FIGS. 3 and 4.

Figure 1:
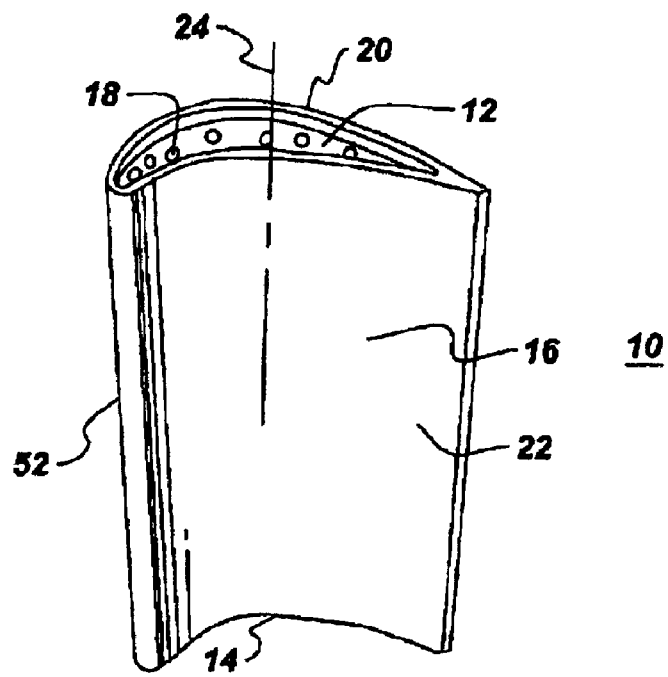
FIG. 1 is a perspective view of a turbine blade airfoil, which includes a number of radial cooling passages.
Figure 2:
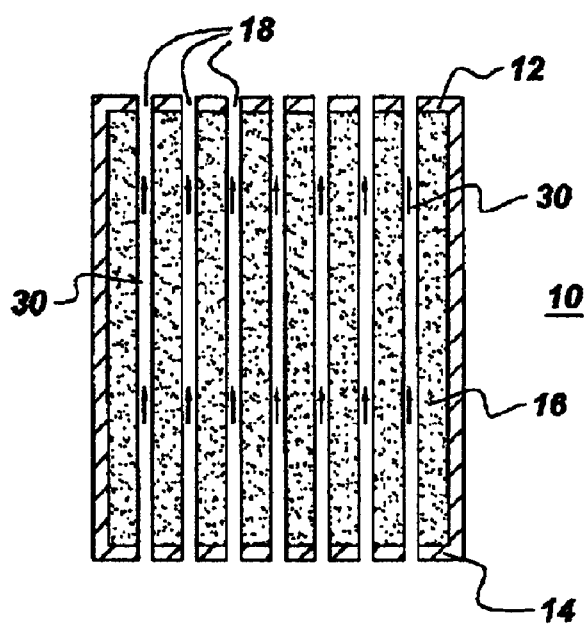
FIG. 2 is a cross-section of the blade airfoil of FIG. 1, including the radial cooling passages.
Figure 3:
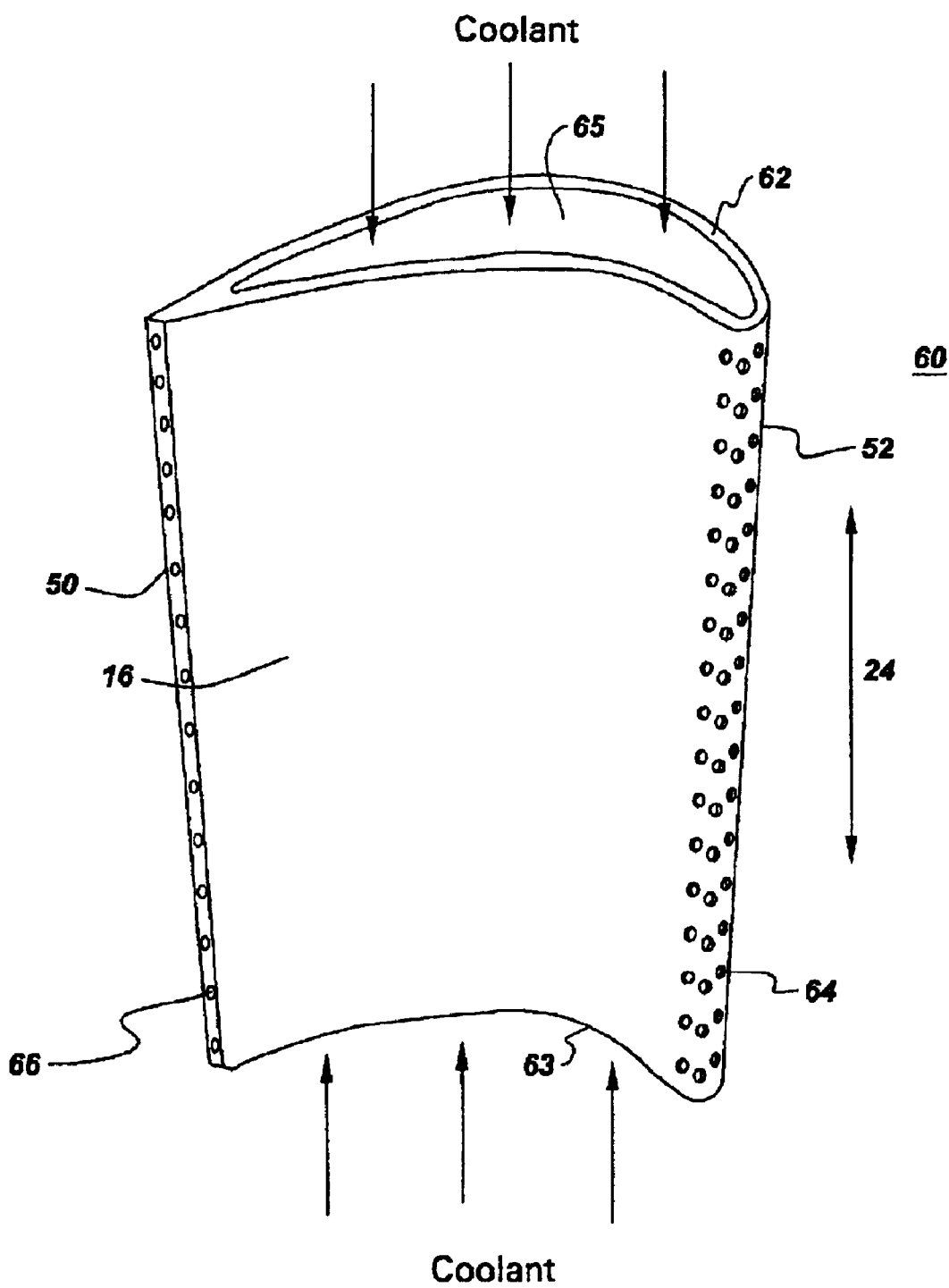
FIG. 3 is a perspective view of a turbine vane airfoil, which includes a number of discharge holes formed in a trailing edge and a leading edge thereof.

As shown in FIGS. 1 and 2, blade airfoil 10 includes a tip 12 and a root 14. The tip includes at least one exit hole 18 for coolant, such as air. A body 16 extends between the tip and the root. Body 16 includes a pressure side 22 and a suction side 20. As shown in FIG. 1, suction side 20 is convex-shaped and pressure side 22 is concave-shaped. A longitudinal axis 24 extends radially outward between tip 12 and root 14. Airfoil 10 further includes a leading edge 52 and a trailing edge 50, as shown in FIG. 1.

Vane airfoil 60 contains elements similar to those described with respect to blade airfoil 10 and the same reference numerals will be used where applicable. As illustrated in FIG. 3, vane airfoil includes a tip 62 and a root 63. Body 16 extends between tip 62 and root 63 and includes one or more central passages 65, as shown for example in perspective view in FIG. 3 (single central passage) and in cross-sectional view in FIG. 12 (two central passages). As illustrated in FIG. 3, coolant flows into single central passage 65 through tip 62 and alternatively or additionally through end 63. For a multiple central passage configuration, such as shown in FIG. 12, entry (and coolant flow) to central passages 65 is provided either at tip 62 or end 63. Vane airfoil 60 further includes leading edge 52 and trailing edge 50, as shown in FIG. 3.

Figure 4:
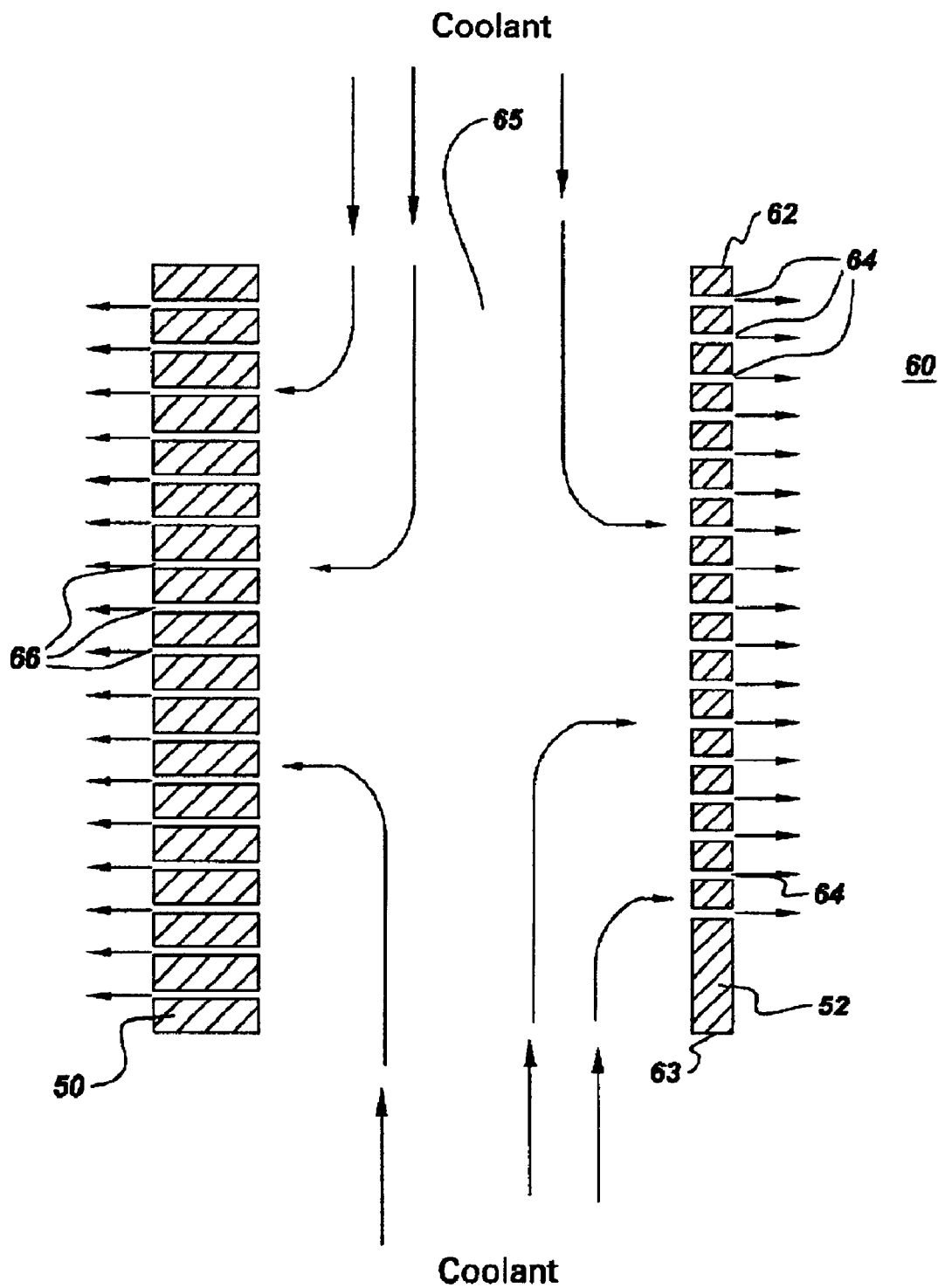
FIG. 4 is a cross-section of the vane airfoil of FIG. 3, including the discharge holes.

As seen in FIGS. 2 and 4, blade airfoil 10 and vane airfoil 60 include cooling passages 30 and 64, 65, 66, respectively. More particularly, blade airfoil 10 includes at least one radial cooling passage 30 that extends through body 16 between tip 12 and root 14. Radial cooling passage 30 directs the flow of cooling air or coolant through blade airfoil 10. As indicated by the arrows in FIG. 2, radial cooling passage 30 directs air toward the tip of the blade airfoil ("radially outward"). After passing through radial cooling passage 30, the coolant exits blade airfoil 10 through exit hole 18 in tip 12. In contrast, coolant enters vane airfoil 60 through central passage 65 and exits vane airfoil 60 through discharge holes 64, 66 in leading edge 52 and trailing edge 50, respectively. For the double central passage 65 configuration shown in FIG. 12, coolant flows through one central passage 65 and through discharge holes 66 to trailing edge 50, and coolant flows through the other central passage 65 and through discharge holes 64 (not shown in the cross-sectional view of FIG. 12) to leading edge 52. Radial cooling passages 30, central passage(s) 65 and discharge holes 64, 66 are referred to herein as "cooling passages" and are generically indicated by reference numeral 101. Further, as understood by one skilled in the art, the term "cooling passage" is used herein to refer to any cooling hole formed in either vane airfoil 60 or blade airfoil 10.

Figure 5:
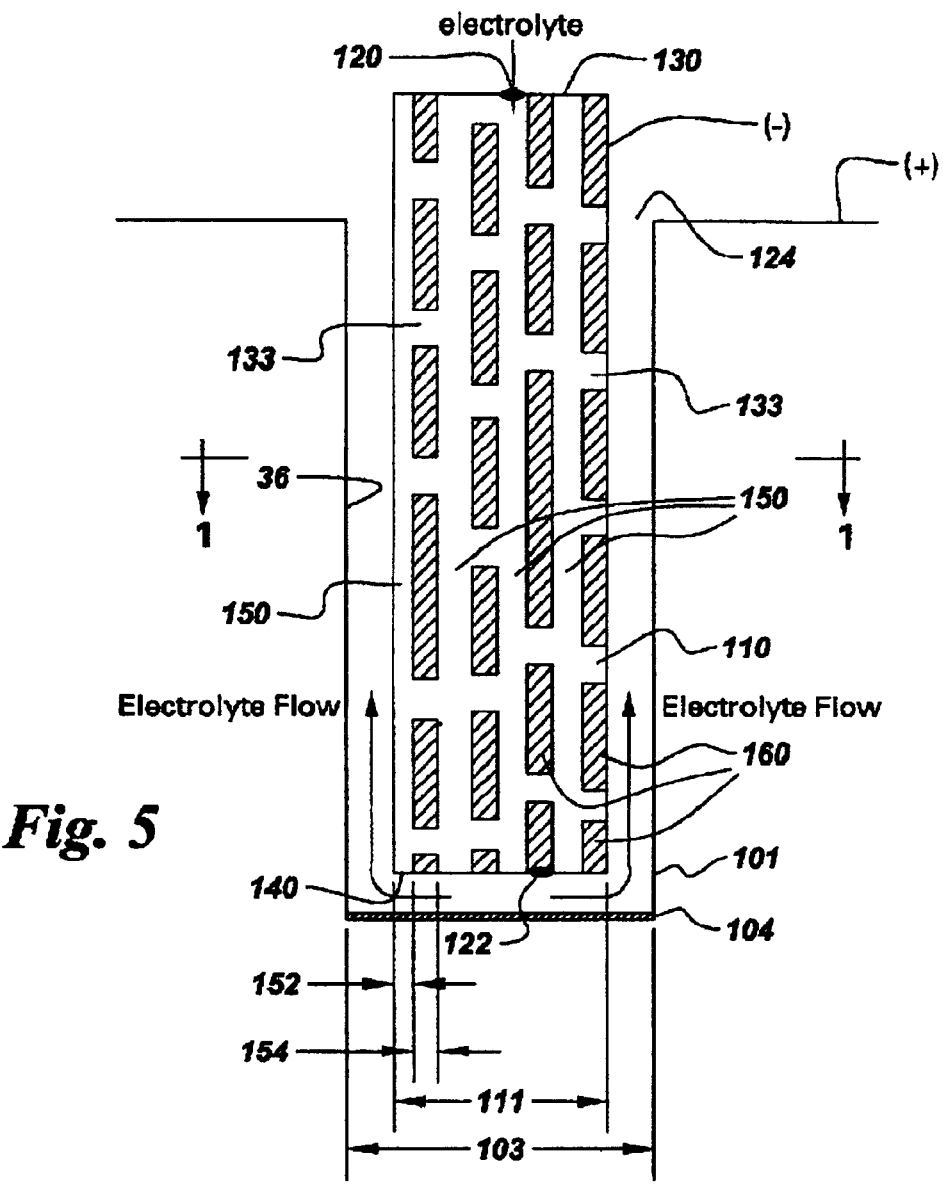
FIG. 5 is a schematic representation of an electrode embodiment of the invention, the electrode being positioned in a cooling passage for forming the rejuvenated cooling passage by electrochemical machining.
Figure 6:
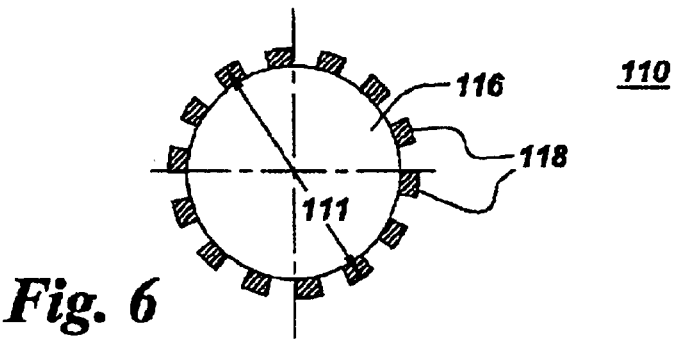
FIG. 6 is a cross-section of the electrode of FIG. 5 taken along the line 1.

The electrode 110 embodiment for rejuvenating cooling passage 101 within airfoil 10, 60 is schematically depicted in FIG. 5, and a cross-section of the electrode taken at line 1 is shown in FIG. 6. Electrode 110 includes a tip 140, an end 130, a conductive core 116, and an insulating coating 118 disposed on conductive core 116, as shown for example in FIGS. 5 and 6. Insulating coating 118 exposes a number of conductive strips 150 of conductive core 116 and forms a number of insulating portions 160. Conductive strips extend between tip 140 and end 130 of electrode 110. Insulating portions 160 substantially span a distance between tip 140 and end 130 and are positioned between conductive strips 150. As used herein, the phrase "substantially span" means either extension along the length of electrode 110 (not shown) or interrupted extension along the length of electrode 110, as shown for example in FIG. 5. Insulating coating 118 further exposes a number of spacer portions 133 of conductive core 116, which are longitudinally positioned between insulating portions 160, as shown for example in FIG. 5. As used here, the phrase "longitudinally positioned" means that spacer portions 133 are positioned between insulating portions 160 in a direction along a length of electrode 110.

To expose conductive strips 150 and spacer portions 133 according to a particular embodiment, insulating coating 118 is partly removed, for example by laser ablation, as shown for example in FIG. 6 for the cross-section of electrode 110 taken at line 1. One exemplary laser ablation technique is described in commonly assigned, above referenced U.S. Pat. No. 6,303,193 B1.

Conductive core 116 is hollow according to one embodiment to allow for pumping of an electrolyte solution into cooling passage 101 through an inlet 120 and out of an exit hole 122, as shown for example in FIG. 5. Exemplary conductive cores are cylindrical in shape, having the circular cross-section shown in FIG. 6. However, other exemplary conductive cores have rectangular or asymmetric cross sections (not shown).

Figure 7:
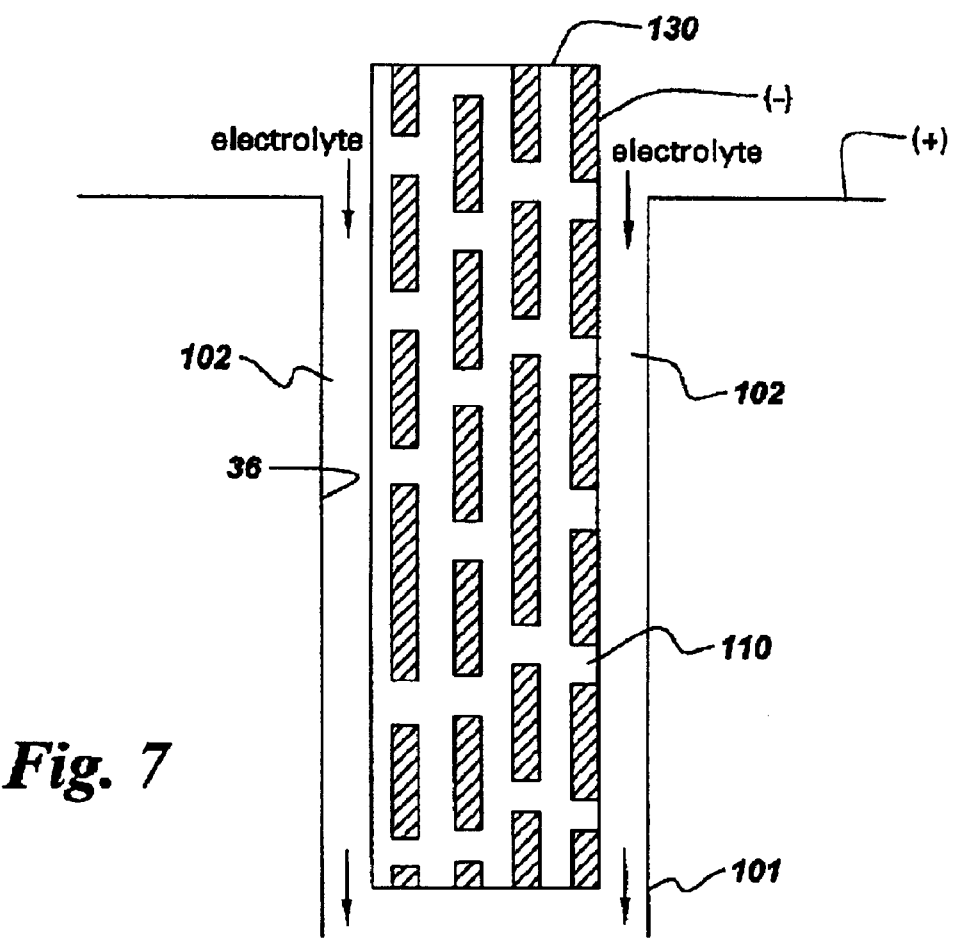
FIG. 7 shows a solid electrode embodiment of the electrode of FIG. 5.

An alternative, solid electrode 110 embodiment is shown in FIG. 7. The solid electrode is similar to hollow electrode 110 except that the conductive core 116 is solid and the electrolyte solution is pumped into cooling passage 101 in the gap 102 between solid electrode 110 and cooling passage 101, as shown for example in FIG. 7.

According to a specific electrode 110 embodiment, conductive strips 150 and spacer portions 133 have width 152 and insulating portions 160 has width 154 of about 0.01 to about 0.06 cm and, more particularly, of about 0.02 to about 0.05 cm. Still more specifically, spacer portions 133 have a length 156 of about 0.01 to about 0.06 cm and, more particularly, of about 0.02 to about 0.05 cm. Advantageously, the exemplary dimensions facilitate machining a number of grooves 32 and fins 34 in cooling passage 101, providing increased surface area of inner surface 36 and corresponding enhanced cooling of airfoils 10, 60.

For one exemplary application of electrode 110, the airfoil is a blade airfoil 10 and the cooling passage 101 is a radial cooling passage 30. For another exemplary application of electrode 110, the airfoil 10 is a vane airfoil 60 and the cooling passage 66 extends between central passage 65 and trailing edge 50. The application of electrode 110 to vane airfoil 60 (or as noted above to "nozzle" 60) is particularly beneficial for land-based turbines because of the length and surface area of cooling passages 66 formed in trailing edges 50 of "nozzles."

Figure 13:
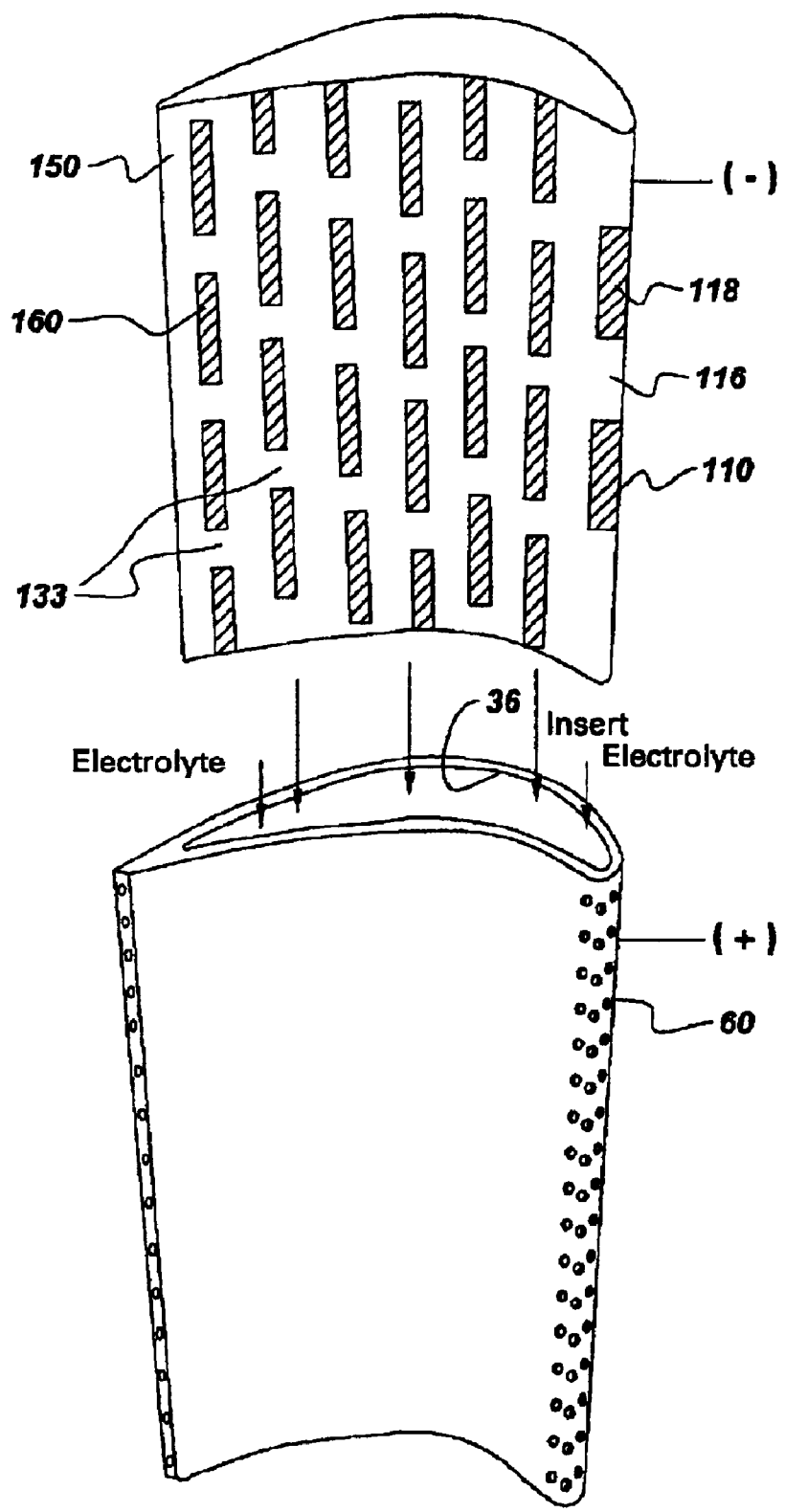
FIG. 13 shows another electrode embodiment for rejuvenating a central passage of the vane airfoil of FIG. 3.
Figure 14:
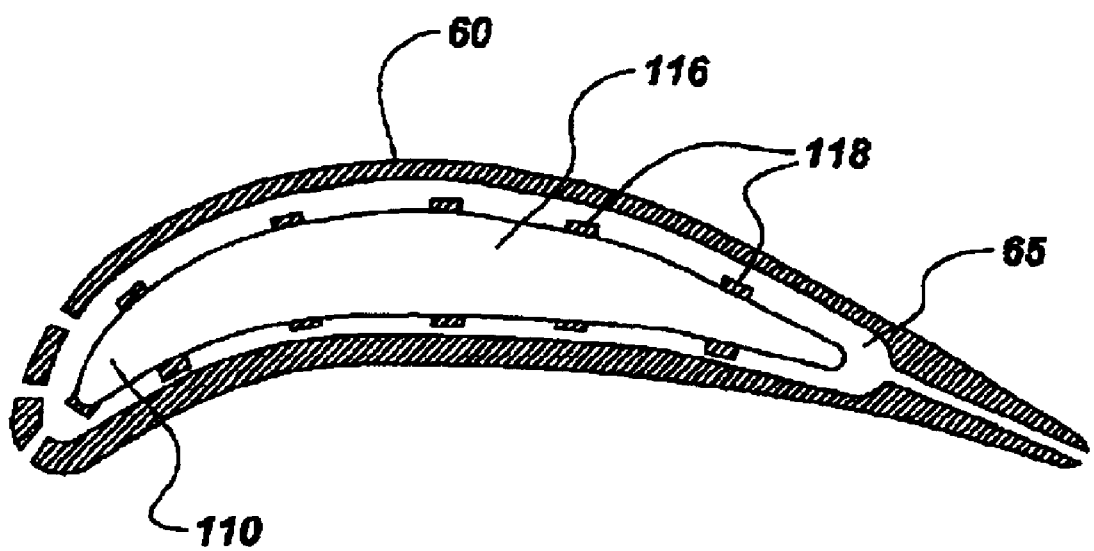
FIG. 14 is a cross-sectional view of the electrode of FIG. 13 surrounded by a central passage of the vane airfoil of FIG. 3.

Another specific electrode embodiment is described with reference to FIGS. 13 and 14. The electrode (also indicated by reference numeral 110) is similar to the above-described electrodes, so only differences between the two embodiments are discussed. As shown in FIG. 13, the electrode is used to rejuvenate central passage 65 of vane airfoil 60. For this embodiment, conductive core 116 conforms to a shape of central passage 65. As used here, the phrase "conforms to a shape of central passage 65 means that conductive core 116 has the same general shape as central passage 65 but is dimensioned such that conductive core 116 and insulating coating 118 fit inside central passage 65 with clearance for the flow of electrolyte between electrode 110 and central passage 65. For example, conductive core 116 is so dimensioned that the average spacing between insulating coating and inner surface 36 of central passage 65 is about 0.004 to about 0.03 cm. Although shown in FIG. 13 for the case of a single central passage 65 configuration, electrode 110 is applicable to multiple central passage configurations as well. Desirably, this embodiment can be used to rejuvenate central passage 65, enhancing convective heat transfer by increasing surface area for heat transfer and by turbulence promotion within central passage 65.

An electrochemical machining method embodiment for rejuvenating at least one cooling passage 101 within airfoil 10, 60 incorporates electrode 110. The electrochemical machining method includes preparing inner surface 36 of cooling passage 101 for electrochemical machining. The preparation includes removing dirt or coating residue (or "residue") from inner surface 36. The electrochemical machining method further includes positioning electrode 110 in cooling passage 101 in airfoil 10, 60, as shown for example in FIGS. 5 and 7.

Figure 8:
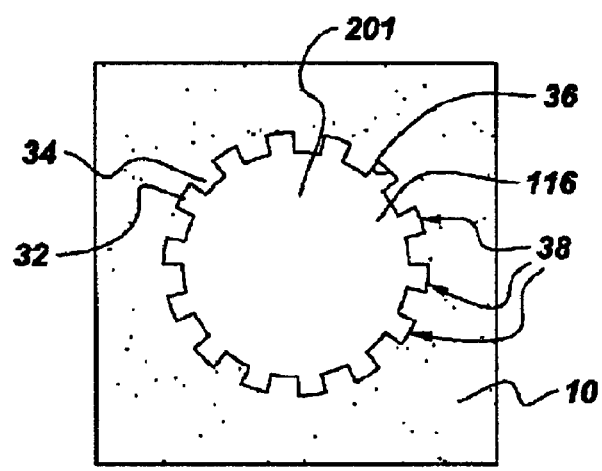
FIG. 8 is a cross-section of a rejuvenated cooling passage formed using the electrode and method embodiments of the invention.

Next, groove pattern 38, 39 is machined on inner surface 36 of cooling passage 101 to form rejuvenated cooling passage 201. An exemplary rejuvenated cooling passage 201 is shown in FIG. 8, in cross-sectional view, and exemplary groove patterns 38, 39 are shown in FIGS. 9 and 10, respectively. Groove pattern 38, 39 includes fins 34 and grooves 32, as shown for example in FIGS. 9 and 10. Fins 34 protrude from inner surface 36 as indicated in FIG. 8. Exemplary groove pattern 39 further includes connectors 33, as shown in FIG. 10, whereas exemplary groove pattern 38 does not. More particularly, to machine groove pattern 39 a number of connectors 33 are formed on inner surface 36 of rejuvenated cooling passage 201, such that fins 34 are interrupted by connectors 33 that connect neighboring grooves 32. To machine groove pattern 39, insulating coating 118 of electrode 110 further exposes spacer portions 133 of conductive core 116, as shown for example in FIG. 5.

Groove pattern 38, 39 is machined by passing an electric current between electrode 110 and airfoil 10, 60 while circulating an electrolyte solution through cooling passage 101. The electrolyte is pumped through an end 124 of cooling passage 101 under pressure. According to a specific embodiment, the electrolyte is acidic, for example Sulfuric acid ($H_2SO_4$) or Nitric acid, and more particularly a five to fifteen percent (5–15%) solution of $H_2SO_4$. The latter embodiment is beneficially applied for machining nickel alloys. Advantageously, acidic electrolyte reduces clogging of narrow cooling passages 101 during electrochemical machining by neutralizing metal hydroxide thus preventing precipitant formation. Alternatively, a salt-based electrolyte, such as an aqueous solution of Sodium Chloride (NaCl) and, more particularly, a fifteen percent (15%) aqueous solution of NaCl, can also be used for the electrochemical machining method of the invention, with adequate electrolyte flush, for example about 90 psi or above. A stronger electrolyte flush is required for a salt electrolyte than for an acidic electrolyte because of the metal hydroxide (sludge) that builds up in the gap between the electrode and the cooling passage.

As illustrated in FIG. 5, where electrode 110 is hollow, the electrolyte enters electrode 110 through inlet 120 and exits through exit hole 122. In order to ensure uniform electrolyte flow, one end of cooling passage 101 is blocked as illustrated in FIG. 5. Cooling passage 101 may be blocked for example by a plug 104 formed of a suitable material, such as rubber. Alternatively, for solid electrode 110, the electrolyte is flowed into the gap 102 between electrode 110 and cooling passage 101, as shown for example in FIG. 7.

The (+) and (–) designations in FIGS. 5 and 7 indicate pulsed voltage through the electrode and airfoil. The current is provided by coupling electrode 110 to a negative terminal of a STEM power supply (not shown) and airfoil 10, 60 to a positive terminal thereof. According to a specific embodiment, a voltage difference of about five (5) to about fifteen (15) V is applied between electrode 110 and airfoil 10, 60 in the presence of an acidic electrolyte. Generally, such low voltages produce better definition of the groove pattern 38, 39. Typically, higher voltages such as voltages up to about twenty five (25) V are used with salt-based electrolytes.

The duration of the machining of groove pattern 38, 39 depends on the material being machined (namely, the material forming inner surface 36 of cooling passage 101), the voltage difference applied between electrode 110 and airfoil 10, 60, the gap 102 between electrode 110 and cooling passage 101, and the desired depth of groove pattern 38, 39. The determination of the desired machining time is determinable by one skilled in the art based upon these considerations. In one example, for inner surface 36 formed of GTD 111 which is a precipitation hardened nickel-based superalloy, applying a voltage difference of about five to about fifteen (5–15) volts (peak amplitude) in the presence of a ten percent (10%) $H_2SO_4$ electrolyte, the machining time to form a groove depth of 0.25 cm is typically within a range of about five to about twelve minutes.

Although electrode 110 is described above as comprising conductive strips 150 and spacer portions 133, for the electrochemical method embodiment electrode 110 more generally comprises exposed portions of conductive core 116. Exemplary exposed portions include the curved and complementary curved exposed portions of copending, commonly assigned U.S. patent application Ser. No. 09/683,189. Other exemplary exposed portions include longitudinally spaced rings (not shown). For the electrode 110 embodiment discussed above, the exposed portions include conductive strips 150 and spacer portions 133.

In order to electrochemically machine cooling passage 101, inner surface 36 of cooling passage 101 must be both clean and sufficiently conductive. However, both ordinary use as well as the processing steps (e.g., coating removal) generally performed during repair operations to turbine airfoils 10, 60 coat the cooling passages 101 with an aluminide coating (such as a vapor-phase aluminide coating or "VPA"). Accordingly, preparation of inner surface 36 according to a specific embodiment includes performing a finishing process to remove non-conductive residue. According to a more particular embodiment, preparation of the inner surface includes performing a chemical stripping process prior to performing the finishing process, wherein the finishing process removes nonconductive residue from the chemical stripping. Exemplary chemical stripping processes employ mixtures of one or more mineral acids, for example nitric acid, phosphoric acid, hydrochloric acid, sulfuric acid, or combinations thereof and further including one or more additives, such as acetic acid or an inhibitor. According to a more particular embodiment, the chemical stripping removes the aluminide coating from cooling passages 101.

Conventional chemical stripping processes typically leave a non-conductive residue (commonly referred to as "smut"). In one embodiment, the finishing process is designed to remove non-conductive residue from inner surface 36 of cooling passages 101, so that electrochemical machining can be effectively performed. An exemplary finishing process includes immersing airfoil 10, 60 in an acidic solution, such as fluosilicic acid ($H_2SiF_6$) that may comprise about zero percent (0%) to about seventy five percent (75%) of a strong mineral acid, such as phosphoric acid, nitric acid, or sulfuric acid. According to one example, the acidic solution comprises about seventy five percent (75%) (vol/vol) fluosilicic acid ($H_2SiF_6$, commercial grade, 23–25% (wt/wt)). The immersion is performed at an exemplary temperature from about ambient to about eighty (80) degrees Celsius for an exemplary time period of about thirty (30) minutes to about five (5) hours, during which time period the nonconductive residue is loosened or dissolved. The exemplary finishing process further includes rinsing airfoil 10, 60, and ultrasonically cleaning the airfoil. For example, airfoil 10, 60 is immersed in a conventional ultrasonic bath containing a wetting agent or surfactant, such as 0.5% Triton® X-100, calcium carbonate (for example, Alconox®), Triton® X-100 [9002-93-1], polyoxyethylene (10) isooctylcyclohexylether, at an exemplary temperature of about ambient to about eighty (80) degrees Celsius for an exemplary time period of about fifteen (15) minutes to about one hour. The exemplary finishing process further includes re-rinsing airfoil 10, 60. Alternatively, the finishing process may comprise ultrasonically cleaning airfoil and rinsing 10, 60, immersing airfoil 10, 60 in the acidic solution, and then re-rinsing airfoil 10, 60.

Advantageously, the combination of the chemical stripping and the finishing provide clean, conductive inner surface 36 of cooling passages 101, promoting effective, uniform electrochemical machining of cooling passages 101. According to a still more particular embodiment, the finishing process further includes flushing cooling passages 101 after the re-rinsing, for example by a high-pressure spray of water or steam to remove remaining residue.

As noted above, for the electrochemical machining method, electrode 110 generally comprises exposed portions of conductive core 116. However, according to a more specific embodiment, exposed portions comprise conductive strips 150, and the insulating coating comprises insulating portions 160. As discussed above with respect to the electrode 110 embodiment, the insulating portions 160 are positioned between the conductive strips 150 to form an alternating pattern. Thus for this embodiment, groove pattern 38, 39 is machined using the alternating pattern. In this manner, fins 34 and grooves 32 are formed on inner surface 36 of rejuvenated cooling passage 201, as shown for example in FIGS. 8–11 in enlarged view. Essentially, material is removed from cooling passage 101 upon application of the electric current in regions of cooling passage 101 coinciding with conductive strips 150 of conductive core 116 in electrode 110. However, insulating portions 160 shield corresponding regions of the cooling passage during application of the electric current, thereby preserving fins 34, which accordingly protrude from inner surface 36 of the rejuvenated cooling passage 201.

According to one embodiment of the electrochemical machining method, electrode 110 is so dimensioned so as to have a diameter 111 that is within a range of about 0.008 to about 0.015 cm, for example about 0.013 cm less than the diameter 103 of cooling passage 101. Exemplary diameters 111 and 103 are indicated in FIGS. 5 and 6. According to one example of this embodiment, the airfoil is a blade airfoil 10, and cooling passage 101 is a radial cooling passage 30. For another example of this embodiment, the airfoil is a vane airfoil 60, and cooling passage 101 extends between a central passage 65 and trailing edge 50. The latter embodiment is particularly useful for land-based applications because of the larger size of discharge holes 66 formed in trailing edges 50 of vane airfoils 60 for land-based applications. In order to perform high definition electrochemical machining, the spacing between electrode 110 and cooling passage 101 should be small. However, due to warping and cracking of cooling passage 101 that can occur during use of turbine airfoil 10, 60, clearance between electrode 110 and cooling passage 101 is desirable so that electrode 110 is smoothly insertable into passage 101 and to provide for the flow of electrolyte between the electrode and passage. The above mentioned clearance of about 0.008 to about 0.015 cm was found to both provide clearance and produce a well defined groove pattern in rejuvenated cooling passage 201.

Another electrochemical machining method for rejuvenating at least one cooling passage 101 within airfoil 10, 60 includes positioning an electrode 110 according to the electrode embodiment discussed above in cooling passage 101. Namely, electrode 110 includes conductive strips 150, insulating portions 160 and spacer portions 133. The electrochemical machining method further includes machining groove pattern 39 on inner surface 36 of cooling passage 101 using conductive strips 150 and spacer portions 133 by passing an electric current between electrode 110 and airfoil 10, 60 while circulating an electrolyte solution through cooling passage 101 to produce rejuvenated cooling passage 201. An exemplary voltage difference of about five (5) to about fifteen (15) V is applied between electrode 110 and airfoil 10, 60 in the presence of an acidic electrolyte. Alternatively, higher voltages such as voltages up to about twenty five (25) V are used with salt-based electrolytes.

An airfoil 10, 60 embodiment of the invention will be described with respect to FIGS. 1–4 and 8–11. The airfoil embodiment encompasses both turbine blade airfoils 10 and turbine vane airfoils 60 and as used here, the term "airfoil" should be understood to encompass both airfoil types. Airfoil 10, 60 includes tip 12, 62, root 14, 63 and body 16 extending between tip 12, 62 and root 14, 63 as shown in FIGS. 1 and 3. The airfoil further includes at least one cooling passage (designated by reference numeral 201 to indicate that cooling passage includes the groove pattern) formed in body 16 and configured to receive coolant. Exemplary cooling passages 201 include radial cooling passages 30 and discharge holes 64, 66 in leading edge 52 and trailing edge 50, respectively, as shown in FIGS. 2 and 4.

FIG. 8 shows a cross-section of cooling passage 201, which has inner surface 36. In order to increase its surface area, cooling passage 201 includes groove pattern 39 formed on inner surface 36, as shown in FIG. 10. As illustrated in FIG. 8, groove pattern 39 includes a number of grooves 32 extending along the length of cooling passage 201, as shown for example in FIG. 10. Groove pattern 39 further includes a number of fins 34 positioned alternately with grooves 32, as shown in FIG. 10 and in cross-section in FIG. 8. Fins 34 substantially span the length of cooling passage 201 as indicated in FIG. 10. Advantageously, cooling passage 201 has a larger surface area as compared to smooth cooling passage 101 (which is shown only in outline form in FIGS. 5 and 7). Namely, groove pattern 39 provides the increased surface area. Consequently, airfoil 10, 60 with cooling passage 201 has a higher heat transfer coefficient thereby increasing turbine engine efficiency relative to an airfoil with smooth cooling passage 101.

As illustrated in FIG. 10, groove pattern 39 further includes a number of connectors 33 longitudinally positioned between two of the fins 34. In this manner, each connector 33 connects two grooves 32. As used here, the phrase "longitudinally positioned" means that connectors 33 are positioned between fins 34 in a direction along longitudinal axis 24. Advantageously, connectors 33 interrupt coolant flow inside cooling passage 201 producing flow turbulence, a thinner boundary layer, and a higher heat transfer coefficient for airfoil 10, 60. The higher heat transfer coefficient, in turn, increases turbine engine efficiency relative to an airfoil with smooth cooling passages 101.

An alternative groove pattern 38 is illustrated in FIG. 9 and includes grooves 32 and fins 34 but does not include connectors 33.

According to a more particular embodiment, fins 34 have a width 42, and grooves 32 have a width 40 of about 0.01 to about 0.06 cm and, more particularly, of about 0.02 to about 0.05 cm. Exemplary fins 34 and grooves 32 have a depth 44 of about 0.01 to about 0.06 cm and, more particularly, of about 0.02 to about 0.05 cm. Further, exemplary connectors 33 have width 42, depth 44, and a length of about 0.01 to about 0.06 cm and, more particularly, of about 0.02 to about 0.05 cm. Widths, 42, 40, depth 44, and length 46 are illustrated in FIG. 11. Advantageously, the exemplary dimensions permit a large number of grooves 32, fins 34, and connectors 33 in rejuvenated cooling passage 201, which is typically small in diameter. Consequently, the exemplary dimensions increase the surface area of inner surface 36, thereby enhancing cooling of airfoils 10, 60.

According to another embodiment, the electrochemical machining method is used to rejuvenate central passage 65 of vane airfoil 60 using electrode 110 described above with respect to FIGS. 13 and 14. This electrochemical machining method is similar to the previously described embodiment, so only the differences are discussed. For this embodiment, conductive core 116 conforms to a shape of central passage 65, as discussed above with respect to FIGS. 13 and 14. More particularly, electrode 110 is applied to an accessible central passage 65. For example, central passage 65 is uncapped prior to performing the electrochemical machining process. Because of the large size of central passage 65, this embodiment enhances the convective heat transfer of vane airfoil 60 by increasing the surface area and turbulence promotion within central passage 65. The method is equally applicable to vane airfoils 60 having single (FIG. 3) and multiple (FIG. 12) central passage configurations.

According to one embodiment, the airfoil is a turbine blade airfoil 10. For this embodiment, cooling passage 201 is a radial cooling passage 30 extending through the body 16 between the tip 12 and the root 14, as shown in FIG. 2. Further, tip 12 includes at least one exit hole 18, the exit hole being connected to the radial cooling passage and configured to vent coolant from the airfoil after the coolant flows through the radial cooling passage. Groove pattern 39 is formed on inner surface 36 of the radial cooling passage 30. According to a more general turbine blade airfoil embodiment, turbine blade airfoil 10 includes a number of radial cooling passages 30, as shown for example in FIG. 2. Correspondingly, a number of exit holes 18 are formed in tip 12, as shown for example in FIGS. 1 and 2. Groove pattern 39 is formed on the inner surface 36 of each radial cooling passage 30. Advantageously, the blade airfoil 10 according to this embodiment has a significantly lower operating temperature relative to a blade airfoil 10 with smooth radial cooling holes 101. For example, the temperature difference can be in excess of forty degrees Celsius. This temperature differential results either in a significant increase in service life for the blade airfoil (for the same coolant flow) or in increased engine efficiency due to a reduction in coolant flow.

According to another embodiment, the airfoil is a turbine vane airfoil 60 having leading edge 52 and trailing edge 50. For this embodiment, an exemplary cooling passage 201 is discharge hole 64 formed in leading edge 52 with groove pattern 39 formed on inner surface 36 of discharge hole 64. Discharge hole 64 is configured to expel coolant from vane airfoil 60, as shown in FIG. 4. Another exemplary cooling passage 201 is discharge hole 66 formed in trailing edge 50 with groove pattern 39 formed on inner surface 36 of discharge hole 66. As shown in FIG. 4, discharge hole 66 is configured to vent coolant from vane airfoil 60. According to a more general embodiment, turbine vane airfoil 60 includes a number of discharge holes 64 in leading edge 52, as shown for example in FIG. 4. Groove pattern 39 is formed on the inner surface 36 of each discharge hole 64. According to another general embodiment, turbine vane airfoil 60 includes a number of discharge holes 66 in trailing edge 50, as shown for example in FIG. 4. Groove pattern 39 is formed on the inner surface 36 of each discharge hole 66. Because trailing edge 50 is generally narrow, cooling trailing edge 50 is difficult. Accordingly, the incorporation of discharge holes 66 having groove pattern 39 is particularly beneficial in view of the cooling benefits of groove pattern 39 discussed above. Namely, the vane airfoil 60 of this embodiment remains cooler for the same coolant flow relative to a vane airfoil with smooth discharge holes, resulting in a longer service life for the airfoil. Alternatively, less coolant need be bled off, improving engine efficiency.

According to yet another embodiment, cooling passage 201 is a rejuvenated cooling passage (also indicated by reference numeral 201). For example, rejuvenated cooling passage 201 is formed using the electrochemical machining method discussed above on an existing cooling passage 101.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An electrochemical machining method for rejuvenating at least one cooling passage within an airfoil, said electrochemical machining method comprising:

preparing an inner surface of the cooling passage for electrochemical machining, including removing residue from the inner surface, wherein said preparation of the inner surface comprises performing a finishing process to remove non-conductive residue;

positioning an electrode in the cooling passage, the electrode comprising a conductive core and an insulating coating, the insulating coating exposing a plurality of exposed portions of the conductive core; and machining a groove pattern on the inner surface of the cooling passage using the exposed portions of the conductive core by passing an electric current between the electrode and the airfoil while circulating an electrolyte solution through the cooling passage, said machining producing a rejuvenated cooling passage.

2. The electrochemical machining method of claim 1, wherein said preparation of the inner surface further comprises performing a chemical stripping process prior to performing the finishing process.

3. The electrochemical machining method of claim 2, wherein said chemical stripping process includes removing a vapor-phase aluminide coating from the inner surface of the cooling passage.

4. The electrochemical machining method of claim 1, wherein said finishing process comprises:

immersing the airfoil in an acidic solution;

rinsing the airfoil;

ultrasonically cleaning the airfoil; and re-rinsing the airfoil.

5. The electrochemical machining method of claim 4, wherein said finishing process further comprises flushing the cooling passage after said re-rinsing.

6. The electrochemical machining method of claim 4, wherein the acidic solution comprises fluosilicic acid.

7. The electrochemical machining method of claim 6, wherein the fluosilicic acid comprises about zero percent (0%) to about seventy five percent (75%) of a mineral acid, the mineral acid comprising phosphoric acid, nitric acid, sulfuric acid, or combinations thereof.

8. An electrochemical machining method for rejuvenating at least one cooling passage within an airfoil, said electrochemical machining method comprising:

preparing an inner surface of the cooling passage for electrochemical machining, including removing residue from the inner surface;

positioning an electrode in the cooling passage, the electrode comprising a conductive core and an insulating coating, the insulating coating exposing a plurality of exposed portions of the conductive core; and machining a groove pattern on the inner surface of the cooling passage using the exposed portions of the conductive core by passing an electric current between the electrode and the airfoil while circulating an electrolyte solution through the cooling passage, said machining producing a rejuvenated cooling passage, wherein the electrode further comprises a tip and an end, the conductive core extending between the tip and the end, wherein the exposed portions comprise conductive strips of the conductive core extending between the tip and the end of the electrode, wherein the insulating coating comprises a plurality of insulating portions which substantially extend between the tip and the end of the electrode, the insulating portions being positioned between the conductive strips to form an alternating pattern, wherein said machining of the groove pattern uses the alternating pattern, and wherein the groove pattern comprises a plurality of alternating grooves and fins, and wherein the conductive strips and the insulating portions are configured so that said machining forms the grooves having dimensions of about 0.01 cm to about 0.06 cm in width and about 0.01 cm to about 0.06 cm in depth and forms the fins having dimensions of about 0.01 cm to about 0.06 cm in width and about 0.01 cm to about 0.06 cm in depth.

9. An electrochemical machining method for rejuvenating at least one cooling passage within an airfoil, said electrochemical machining method comprising:

preparing an inner surface of the cooling passage for electrochemical machining, including removing residue from the inner surface;

positioning an electrode in the cooling passage, the electrode comprising a conductive core and an insulating coating, the insulating coating exposing a plurality of exposed portions of the conductive core; and machining a groove pattern on the inner surface of the cooling passage using the exposed portions of the conductive core by passing an electric current between the electrode and the airfoil while circulating an electrolyte solution through the cooling passage, said machining producing a rejuvenated cooling passage, wherein the electrode further comprises a tip and an end, the conductive core extending between the tip and the end, wherein the exposed portions comprise conductive strips of the conductive core extending between the tip and the end of the electrode, wherein the insulating coating comprises a plurality of insulating portions which substantially extend between the tip and the end of the electrode, the insulating portions being positioned between the conductive strips to form an alternating pattern, wherein said machining of the groove pattern uses the alternating pattern, and wherein the groove pattern comprises a plurality of alternating grooves and fins, and wherein the airfoil comprises a blade airfoil, the cooling passage comprises a radial cooling hole, and the electrode is so dimensioned so as to have a diameter, which is within a range of about 0.008 to about 0.015 cm less that the diameter of the cooling passage.

10. An electrochemical machining method for rejuvenating at least one cooling passage within an airfoil, said electrochemical machining method comprising:

preparing an inner surface of the cooling passage for electrochemical machining, including removing residue from the inner surface;

positioning an electrode in the cooling passage, the electrode comprising a conductive core and an insulating coating, the insulating coating exposing a plurality of exposed portions of the conductive core; and machining a groove pattern on the inner surface of the cooling passage using the exposed portions of the conductive core by passing an electric current between the electrode and the airfoil while circulating an electrolyte solution through the cooling passage, said machining producing a rejuvenated cooling passage, wherein the electrode further comprises a tip and an end, the conductive core extending between the tip and the end, wherein the exposed portions comprise conductive strips of the conductive core extending between the tip and the end of the electrode, wherein the insulating coating comprises a plurality of insulating portions which substantially extend between the tip and the end of the electrode, the insulating portions being positioned between the conductive strips to form an alternating pattern, wherein said machining of the groove pattern uses the alternating pattern, and wherein the groove pattern comprises a plurality of alternating grooves and fins, and wherein the airfoil comprises a vane airfoil having a central passage and a trailing edge, the cooling passage extends between the central passage and the trailing edge, and the electrode is so dimensioned so as to have a diameter, which is within a range of about 0.008 to about 0.015 cm less that the diameter of the cooling passage.

11. An electrochemical machining method for rejuvenating at least one cooling passage within an airfoil, said electrochemical machining method comprising:

preparing an inner surface of the cooling passage for electrochemical machining, including removing residue from the inner surface;

positioning an electrode in the cooling passage, the electrode comprising a conductive core and an insulating coating, the insulating coating exposing a plurality of exposed portions of the conductive core; and machining a groove pattern on the inner surface of the cooling passage using the exposed portions of the conductive core by passing an electric current between the electrode and the airfoil while circulating an electrolyte solution through the cooling passage, said machining producing a rejuvenated cooling passage, wherein the electrode further comprises a tip and an end, the conductive core extending between the tip and the end, wherein the exposed portions comprise conductive strips of the conductive core extending between the tip and the end of the electrode, wherein the insulating coating comprises a plurality of insulating portions which substantially extend between the tip and the end of the electrode, the insulating portions being positioned between the conductive strips to form an alternating pattern, wherein said machining of the groove pattern uses the alternating pattern, and wherein the groove pattern comprises a plurality of alternating grooves and fins, wherein the insulating coating further exposes a plurality of spacer portions of the conductive core, the spacer portions being longitudinally positioned between the insulating portions, and wherein the groove pattern further includes a plurality of connectors, each connector being longitudinally positioned between two of the fins and connecting two of the grooves, wherein the conductive strips and the insulating portions are dimensioned so that said machining forms the grooves having dimensions of about 0.01 cm to about 0.06 cm in width and about 0.01 cm to about 0.06 cm in depth and forms the fins having dimensions of about 0.01 cm to about 0.06 cm in width and about 0.01 cm to about 0.06 cm in depth, and wherein the spacer portions are dimensioned so that the fins are spaced by about 0.01 cm to about 0.06 cm along a longitudinal direction.

* * * * *